(12) United States Patent
Gray et al.

(10) Patent No.: US 9,719,596 B2
(45) Date of Patent: Aug. 1, 2017

(54) PISTON RING FOR INTERNAL COMBUSTION ENGINES WITH INCREASED FATIGUE STRENGTH, AND METHOD FOR PRODUCING SAME

(71) Applicant: FEDERAL-MOGUL BURSCHEID GMBH, Burscheid (DE)

(72) Inventors: Nigel Gray, Bergisch Gladbach (DE); Stephan Machliner, Leverkusen-Opladen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 14/653,611

(22) PCT Filed: Oct. 29, 2013

(86) PCT No.: PCT/EP2013/072547
§ 371 (c)(1),
(2) Date: Jun. 18, 2015

(87) PCT Pub. No.: WO2014/108226
PCT Pub. Date: Jul. 17, 2014

(65) Prior Publication Data
US 2015/0354702 A1    Dec. 10, 2015

(30) Foreign Application Priority Data
Jan. 10, 2013   (DE) .................. 10 2013 200 261

(51) Int. Cl.
*B23P 9/02*    (2006.01)
*F16J 9/26*    (2006.01)
(Continued)

(52) U.S. Cl.
CPC .  *F16J 9/26* (2013.01); *B23P 9/02* (2013.01); *B23P 15/06* (2013.01); *F16J 9/02* (2013.01);
(Continued)

(58) Field of Classification Search
CPC ....... F16J 9/26; F16J 9/20; F16J 9/206; B23P 15/08; B23P 15/06; C23C 14/0641; C23C 8/04
See application file for complete search history.

(56) References Cited

U.S. PATENT DOCUMENTS 3,337,938 A * 8/1967 Prasse .................... B23P 15/08
                                                                29/527.4
5,316,321 A * 5/1994 Ishida ....................... F16J 9/26
                                                                277/443
(Continued)

FOREIGN PATENT DOCUMENTS

DE      1751573 A1    5/1971
DE      2349516 A1    4/1974
(Continued)

*Primary Examiner* — Eugene G Byrd
(74) *Attorney, Agent, or Firm* — Robert L. Stearns; Dickinson Wright, PLLC

(57) ABSTRACT

A piston ring (2) having increased fatigue resistance includes a plastically deformable material. The piston ring (2) has a running face (4), which is delimited at the top by an upper running face edge (3) and at the bottom by a lower running face edge (1). Compressive stresses are introduced into the upper running face edge (3) and/or into the lower running face edge (1) along at least one part of the circumference, the compressive stresses having been produced by roller burnishing.

11 Claims, 2 Drawing Sheets

(51) Int. Cl.
*F16J 9/22* (2006.01)
*F16J 9/20* (2006.01)
*F16J 9/02* (2006.01)
*B23P 15/06* (2006.01)

(52) U.S. Cl.
CPC .................. *F16J 9/20* (2013.01); *F16J 9/203* (2013.01); *F16J 9/22* (2013.01); *Y10T 29/49281* (2015.01)

(56) References Cited

U.S. PATENT DOCUMENTS

| | | | | |
|---|---|---|---|---|
| 5,605,741 | A * | 2/1997 | Hite ...................... | B23P 15/06 277/443 |
| 6,161,837 | A * | 12/2000 | Shureb ................ | C23C 14/025 277/443 |
| 6,562,480 | B1 * | 5/2003 | Stong ...................... | C23C 4/06 29/888.074 |
| 8,561,998 | B2 * | 10/2013 | Marques .................. | C23C 8/02 277/443 |
| 2007/0210524 | A1 * | 9/2007 | Herbst-Dederichs ...... | F16J 9/26 277/310 |
| 2008/0007006 | A1 * | 1/2008 | Kawai .................. | C23C 14/024 277/310 |
| 2009/0174150 | A1 * | 7/2009 | Smith ...................... | F16J 9/206 277/442 |
| 2010/0044967 | A1 * | 2/2010 | Esser ........................ | F16J 9/26 277/442 |
| 2010/0090416 | A1 | 4/2010 | Tomanik et al. | |

FOREIGN PATENT DOCUMENTS

| | | | |
|---|---|---|---|
| DE | 39 03 722 A1 | 8/1989 | |
| DE | 102011014483 | * 3/2011 | ............... C23C 8/04 |
| EP | 0949436 A2 | 10/1999 | |
| EP | 1 431 631 A1 | 6/2004 | |
| EP | 1 876 345 A1 | 1/2008 | |
| WO | WO 88/00289 A1 | 1/1988 | |
| WO | WO 2009/155677 A1 | 12/2009 | |

* cited by examiner

PISTON RING FOR INTERNAL COMBUSTION ENGINES WITH INCREASED FATIGUE STRENGTH, AND METHOD FOR PRODUCING SAME

BACKGROUND OF THE INVENTION

1. Technical Field

The invention relates to a piston ring and to a method for the production thereof. The piston ring comprises a plastically deformable material and has at least one edge between a running face and a piston ring flank, compressive stresses being introduced into the edge between the running face and the piston ring flank by roller burnishing.

2. Related Art

Conventional piston rings tend to fracture on loading. Piston rings are loaded thermally and dynamically during engine operation. In particular, high combustion pressures in conjunction with the axial groove play result in the piston rings being able to twist in the piston ring groove of a piston. The greatest stresses occur on the lower or upper running edge in the ring back opposite the ring gap on the piston ring (at 180°). If these stresses become too great, one or more hairline or incipient cracks occur in the boundary zone. These hairline cracks become bigger over time, which ultimately results in ring fracture.

Conventional possibilities of counteracting ring fractures consist in increasing the strength of the material or increasing the thickness of the material used. In the case of edge fractures, the strength of the edge can be further increased by the use of an insert.

Furthermore, fatigue fractures proceeding from hairline cracks that have formed at the edge of a piston ring occur in piston rings that twist on loading.

SUMMARY OF THE INVENTION AND ADVANTAGES

The object of the present invention consists in increasing the fracture resistance and fatigue resistance of piston rings that are produced from metal such as iron or steel materials.

Furthermore, an object of the present invention consists of improving the crack formation behaviour of piston rings that are subjected to twisting load during operation.

This problem can be solved by a piston ring having increased fatigue resistance that comprises a plastically deformable material. The piston ring has a running face, which is delimited at the top by an upper running face edge and at the bottom by a lower running face edge. In the piston ring according to the invention, compressive stresses are introduced into the upper running face edge and/or into the lower running face edge at least along a part of the circumference of the piston ring, the compressive stresses having been introduced into the piston ring edge by roller burnishing.

The problem is solved according to the invention by a local increase in fatigue resistance. The fatigue resistance is achieved by roller burnishing at least a part of the edge of the running face of the piston ring. Roller burnishing is a type of rolling of the piston ring in the region of the respective edge, as a result of which compressive stresses are built up in the material. These compressive stresses are intended to prevent tensile stresses that are great enough to cause crack formation occurring on the surface of the piston ring when the edge of the piston ring is loaded. As a result of the compressive stresses, the piston ring is not deformed as much on loading, which in turn leads to a reduction in crack progression in the case of alternating loads. According to the invention, the known machining method of roller burnishing, which has previously been used mainly for surface polishing, is used to produce compressive stresses at the upper and/or lower edge of the running face of the piston ring. The term "upper and/or lower edge of the running face" of the piston ring should be interpreted as meaning the edge of the outer face and the lower/upper flank of the piston ring. A distinction between the respective edges of the nose is only made in the case of scraper rings. Compressive stresses at the upper and/or lower outer edges of the piston ring can also be produced with the roller burnishing. An increase in the fatigue resistance of 30% was achieved using roller burnishing, with a local plastic deformation of the metal from which the piston ring is manufactured. The present invention thus allows an increase in the fatigue and fracture resistance of a piston ring without having to resort to expensive materials or to designs or layouts that can only be produced at great cost.

In a further embodiment of the piston ring, compressive stresses are introduced by roller burnishing only into the lower running face edge. Precisely the lower edge of the running face or also the lower edge of the piston ring (if these do not coincide) are subjected to increased load owing to the combustion gases. Therefore, cracks occur more often at the lower edge. In a first, simple embodiment of the piston ring according to the invention, only the lower boundary of the piston ring or of the running face is treated by roller burnishing.

In another embodiment of the piston ring, compressive stresses are introduced by roller burnishing only at the upper edge of the running face. This embodiment is advantageous in particular for piston rings that are twisted outwards during operation, i.e. in which the upper outer edge is loaded with tensile stresses during operation.

In an additional embodiment of the piston ring, compressive stresses are introduced by roller burnishing into both the upper and lower running face edges. This embodiment allows the edges of a piston ring of rectangular cross section to be protected from crack formation. The edges of a body are particularly susceptible to the formation of cracks, since the material at the edge is not supported by further material that can absorb tensile forces on two sides of the crack.

In a further embodiment of the piston ring, the running face edge into which compressive stresses are introduced by roller burnishing is in each case provided with a bevel. The bevel has been produced by roller burnishing. The edge has been divided by the roller burnishing into two separate edges, each with substantially more obtuse angles.

In another embodiment of the piston ring, the running face edge into which rounded portion compressive stresses are also introduced by roller burnishing is in each case rounded off by roller burnishing. A radius of curvature of the edge that has been provided with the compressive stresses is between 20 µm and 100 µm, preferably between 30 µm and 80 µm, and further preferably between 40 µm and 60 µm. A radius of curvature of 50 µm within the production tolerances is likewise intended. The curvature makes it possible to avoid or at least reduce notch effects.

In a further embodiment of the piston ring, the running face is further provided with at least one wear protection coating or running-in coating. Depending on the type of coating, this can be applied before or after roller burnishing and introduction of the compressive stresses. However, it should be ensured that the piston ring is no longer heated much by the roller burnishing after introduction of the compressive stresses, since otherwise stress-free annealing is initiated, which reduces the introduced stresses. Furthermore, it should be noted that a hard wear resistance layer can make roller burnishing impossible, if the layer cannot be deformed and breaks during roller burnishing. It is provided for a part of the running face to be provided with a wear resistance layer, the edge into which compressive stresses are introduced by roller burnishing not being provided with the wear resistance layer.

In another embodiment of the piston ring, the piston ring comprises an iron or steel material or consists substantially or entirely of an iron or steel material. Iron and steel materials can be provided with plastically deformable properties, which is necessary for machining by roller burnishing.

In a further embodiment of the piston ring, the piston ring is formed as a compression ring. In another embodiment of the piston ring, the piston ring is formed as a rectangular ring. In an additional embodiment of the piston ring, the piston ring is formed as a tapered compression ring. In a further embodiment of the piston ring, the piston ring is formed as a piston ring with an inner bevel. In another embodiment of the piston ring, the piston ring is formed as a piston ring with an inner angle. In an additional embodiment of the piston ring, the piston ring is formed as a tapered compression ring with an inner bevel. In a further embodiment of the piston ring, the piston ring is formed as a tapered compression ring with an inner angle. In another embodiment of the piston ring, the piston ring is formed as a double-sided trapezium ring. In an additional embodiment of the piston ring, the piston ring is formed as a one-sided trapezium ring. In a further embodiment of the piston ring, the piston ring is formed as an L-shaped compression ring.

In another embodiment of the piston ring, the piston ring is formed as a scraper ring. In an additional embodiment of the piston ring, the piston ring is formed as a tapered scraper ring. In the case of a (tapered) scraper ring, the outer edge of a (lower) piston ring flank of the piston ring does not coincide with the (lower) edge of the running face of the piston ring. In this case, compressive stresses can be introduced by roller burnishing only at the outer edge of a lower piston ring flank of the piston ring. In the case of (tapered) scraper rings, preferably both the outer edge of a (lower) piston ring flank of the piston ring and the (lower) edge of the running face of the piston ring are provided with compressive stresses by roller burnishing. The (tapered) scraper rings can have an open or closed gap, an open gap greatly simplifying machining.

In a further embodiment of the piston ring, the compressive stresses are introduced only into a part of the circumference of the piston ring. The compressive stresses are introduced into the corresponding edges only at an angular distance of at least 45°, preferably 90°, further preferably 135° from a piston ring gap. This region of the piston ring, which is also referred to as the ring back, absorbs the greatest stresses. The ring back is thus also particularly susceptible to cracks and fractures. By introducing the compressive stresses only into a part of the circumference of the piston ring, in particular the machining time and thus also the throughput on a roller burnishing machine can be improved, as a result of which the costs for this working step can be reduced.

In another embodiment of the piston ring, the compressive stresses are introduced along the entire upper and/or lower edge of the piston ring. This embodiment allows the roller burnishing process to be carried out with rapidly rotating machines, in this case the machining of the entire ring allowing faster machining of the piston ring edges that conserves the machine.

According to another aspect of the present invention, a method is provided for increasing the fatigue and fracture resistance of a piston ring that comprises a ductile, plastically deformable material. The piston ring has a running face, which is delimited at the top by an upper running face edge and at the bottom by a lower running face edge. The method comprises introducing compressive stresses into at least a part of the circumference of the piston ring by machining the upper face edge and/or the lower running face edge by roller burnishing. This method step is carried out as one of the last manufacturing steps on a piston ring produced in a largely conventional manner. The side of the piston ring that faces radially outwards is in this case regarded as the running face.

In a further embodiment of the method, only the lower running face edge is provided with compressive stresses by roller burnishing.

In another embodiment of the method, only the upper running face edge is provided with compressive stresses using a roller burnishing process.

In an additional embodiment of the method, at least some of both edges, the upper and the lower running face edges, are provided with compressive stresses at the edges by roller burnishing.

In a further embodiment of the method, the running face edge into which compressive stresses are introduced by roller burnishing is in each case also provided with a bevel or rounded off by the roller burnishing process. In this embodiment, the average radius of curvature of the edge(s) is increased by the roller burnishing. A rounded edge has (where appropriate after post-machining steps) a radius of curvature of 20 µm to 100 µm, preferably between 30 µm and 80 µm, and further preferably between 40 µm and 60 µm.

In an additional embodiment of the method, said method comprises applying a running-in coating after the step of introducing the compressive stresses and/or applying a wear protection coating, and/or wherein the step of introducing the compressive stresses by roller burnishing is carried out after a tempering step. Tempering in this case means any heat treatment such as hardening or annealing that is suitable for substantially reducing stresses in the material owing to the temperatures of said heat treatment. The introduced compressive stresses would be decreased again by the tempering. Depending on the protective layer selected and the necessary method parameters, the step of roller burnishing is carried out to introduce compressive stresses before or after applying a running-in or wear protection layer. In any case, the roller burnishing should be carried out only after the last method step that requires such high temperatures that de-stressing of the material occurs.

In an additional embodiment of the method, compressive stresses are introduced by roller burnishing into an outer edge of a lower piston ring flank of the piston ring. This embodiment is used mainly for what are known as scraper rings, in which a step is arranged between the lower piston ring flank and the running face of the piston ring. The compressive stresses can then be introduced at the two convex edges of a groove that forms the nose of a scraper ring.

In a further embodiment of the method, compressive stresses are introduced only into a part of the piston ring that has an angular distance from a piston ring gap of at least 45°, preferably 90°, further preferably 135°. This part of the piston ring opposite the piston ring gap is also referred to as the ring back. It is therefore provided for the lower outer edge of the piston ring to be roller-burnished and provided with compressive stresses only in the region of the ring back.

In another embodiment of the method, the compressive stresses are introduced along the entire upper and/or lower edge of the piston ring.

It should also be noted that it is not provided for the running face outside the edges to be roller-burnished or provided with compressive stresses. It is likewise not provided for the piston ring flanks outside the edges to be roller-burnished or provided with compressive stresses. The roller burnishing should only be carried out so far from the edge that no burrs are produced on the edge and a smooth transition of the rounded edge to the running face or lower (upper) piston ring flank can be ensured.

THE DRAWINGS

The invention is explained below using schematic figures of exemplary embodiments.

DETAILED DESCRIPTION

The same reference symbols are used for the same or similar components in the figures and in the description.

Figure 1:
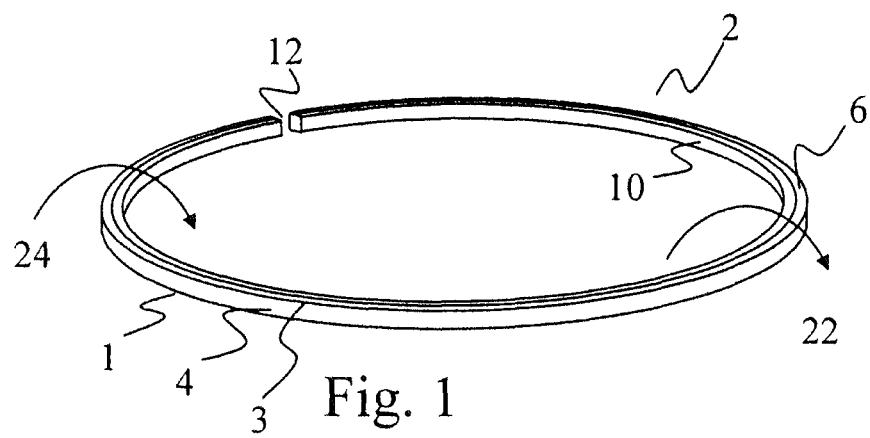
FIG. 1 shows a perspective view of a piston ring.

FIG. 1 shows a perspective view of a piston ring 2. The piston ring 2 has a running face 4 on the outside. The lower side of the piston ring, which cannot be seen in the figure, forms the lower flank of the piston ring 2, which is provided with the reference symbol 8 in the other figures. The upper side of the piston ring is formed by the upper piston ring flank 6. The running face 4 meets the upper piston ring flank 6 at the upper edge 3 of the running face 4. The running face 4 meets the lower piston ring flank, the reference symbol 8 of which is not shown in this figure, at the lower edge 1 of the running face 4. The piston ring is delimited on the inside by the inner face 10 of the piston ring. The piston ring 2 is open at the ring gap 12.

During loading, the piston ring 2 can be rotated outwards at the top. If the piston ring is rotated outwards at the top, this can also be referred to as a negative twist 22. The edge 3 of the running face 4 is in particular loaded in a tensile manner owing to this negative twisting. This tensile load can cause crack formation at the upper edge 3.

The piston ring 2 can however also be twisted inwards at the top on loading, which corresponds to the movement direction for a positive twist 24. The lower edge 1 of the running face 4 is in particular loaded in a tensile manner owing to this positive twisting. This tensile load, together with severe loading owing to a pressure of the combustion gases, can cause crack formation at the lower outer edge 1 of the running face or piston ring 2. The lower edge 1 of the running face 4 is in this case much more susceptible to cracks than the upper edge 3 of the running face 4 owing to the greater load.

The piston ring has been provided at the lower edge 1 of the running face 4 with compressive stresses by roller burnishing, as a result of which the lower edge 1 is rounded out and has compressive stresses. These compressive stresses can be detected by means of changes in the metal microstructure at the roller-burnished lower edge 1, for example during finishing grinding. This is possible because the roller-burnishing process effects a ductile material displacement, which is in turn detectable under a microscope during etched finishing grinding. The roller-burnished region can be very small and narrow, for which reason it is possible that the piston ring according to the invention cannot be distinguished from a conventional piston ring with the naked eye.

Figure 2:
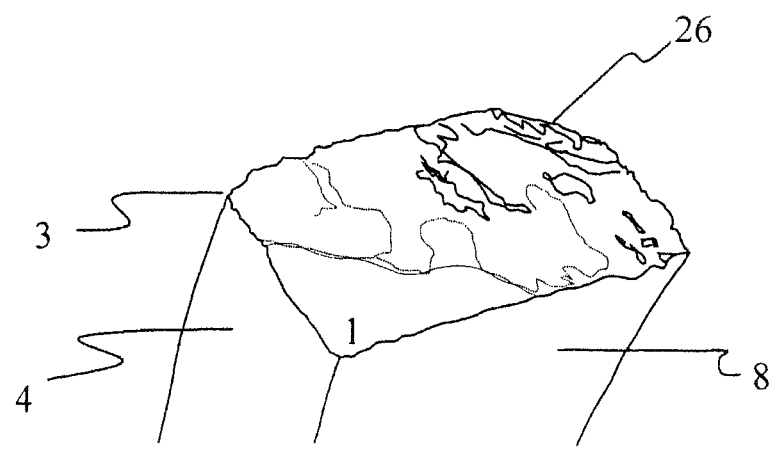
FIG. 2 shows an electron microscope image of a fracture in a conventional piston ring.

FIG. 2 shows an SEM (scanning electron microscope) image of a fractured face of a conventional piston ring. In this case the different topographies within the fracture surface can be seen more clearly: Starting from the lower edge of the running face or running edge 1, the crack extends into the ring cross section. In the process, a very fine surface structure is produced, which is typical for a fatigue fracture under alternating load. If a weakness of approx. ⅓ of the ring cross section is reached, an overload fracture occurs, which can be recognised by the typical coarser surface structure. The surface of the overload fracture has a coarser structure than the region in which there is a fatigue fracture. The position of the piston ring can be seen clearly by means of the indicated upper running face edge 3, the running face 4 and the lower flank 8 of the piston ring as well as the inner bevel 26 of a piston ring.

Figure 3:
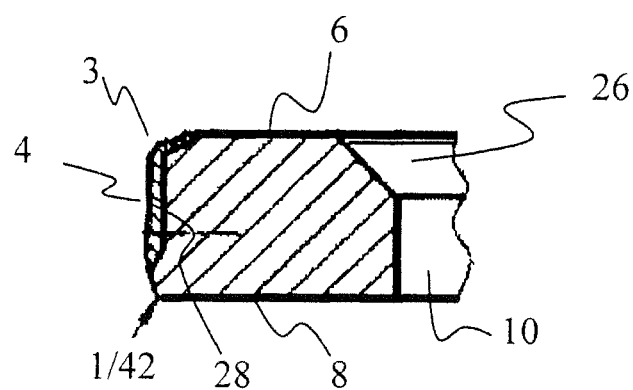
FIG. 3 shows a cross section of a piston ring according to the invention, which is provided with a wear protection layer.

FIG. 3 shows a cross section of a piston ring according to the invention, which is provided with a wear protection layer. The shape of the lower running edge has considerable influence on the fatigue and fracture resistance of a piston ring. Coated edges (chromium, PVD) are more susceptible to crack formation than uncoated edges.

Furthermore, thick layers consisting of hard materials are likewise more affected by crack formation than thin layers. Furthermore, high-strength wear protection layers tend to form cracks more than for example running-in layers consisting of lower-strength material. Sharp edges, i.e. edges with small radii of curvature tend to form cracks more than rounded edges with larger radii of curvature.

The cross section of FIG. 3 through a piston ring according to the invention shows an embodiment that combines the lower edge 1 of the running face 4 that is provided with compressive stresses with the features of a configuration of a piston ring that is currently regarded as favourable in terms of fatigue fracture resistance.

The ring 2 is manufactured from a high-quality cast material or a steel material. A coating 28 has the lowest possible thickness of at least 30 μm (which is in this case shown schematically with exaggerated thickness). The wear protection layer 28 is chambered, the wear protection layer 28 not extending as far as the lower edge 1 of the running face 4. The lower running edge 1 is exposed and can therefore be machined by roller burnishing without cracks being produced in the coating even if a very hard wear protection layer 28 is used. The lower edge 1 is roller-burnished, as a result of which compressive stresses are present in the lower edge 1. The roller burnishing produces a radius of curvature 42 of 45 μm. The radius of curvature is between 20 μm and 70 μm, preferably between 30 μm and 60 μm, and further preferably between 40 μm and 50 μm.

The rounding can be achieved by roller burnishing or an already pre-rounded edge can be provided with compressive stresses by roller burnishing.

The rounding of the lower running edge 1 with a larger radius of 50 μm compared with the conventional 20 μm allows the fatigue fracture resistance to be further increased.

According to previous experience, a radius of curvature of the lower edge 1 of the running face 4 within a range between 50 and 80 μm is still acceptable in terms of the oil-scraping effect. Limitations of the oil-scraping effect are to be expected with radii of curvature upwards of 100 μm.

The application of large radii is associated with a clear increase in costs in the ring production process, since defined large radii can only be achieved by machining rings individually. Smaller radii of curvature to approx. 20 μm on average can be achieved by inexpensive polishing of the running faces by machining in bundles.

Figure 4:
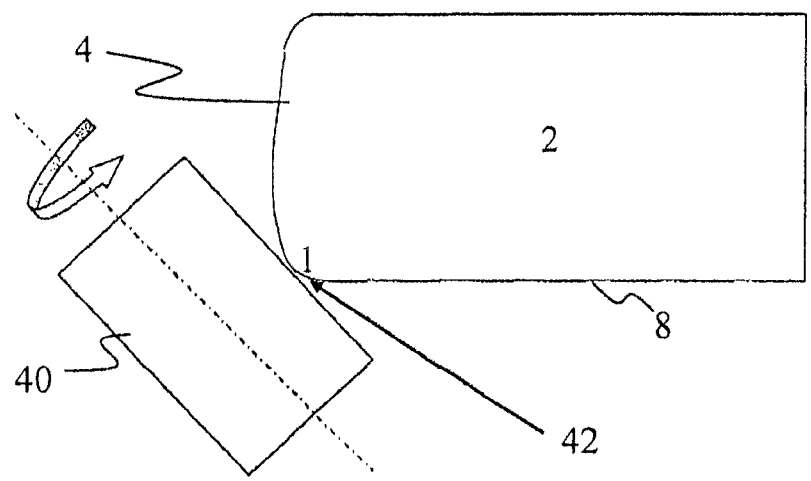
FIG. 4 shows a cross-sectional view of a piston ring according to the invention during a roller-burnishing process according to the invention.

FIG. 4 shows a cross-sectional view of a piston ring according to the invention during a roller-burnishing process according to the invention. Here, the burnishing roll 40 is pressed against the lower edge 1 between the running face 1 and the lower flank 8 of the piston ring 2 in order to produce a rounded portion 42, build up compressive stresses in the edge and smooth. The present invention aims to further increase fatigue strength. According to the invention, an edge rounding on the rings is achieved not only by material removal but also by material compression and displacement (roller burnishing) at least of the lower edge 1 between the running face 4 and the lower piston ring flank 8 of the piston ring. Owing to the roller burnishing and the material compression during roller burnishing, compressive stresses are introduced into the piston ring into the material in the region of highest load 42 at the running face edge 1 by the burnishing roll 40. Compressive stresses in this critical ring region counteract the occurrence of cracks in the edge region, as a result of which the fatigue strength of the ring is considerably further increased. The effect is achieved inter alia by displacing the tensile stresses from the surface with its surface roughness to below the surface, in which an ideally pore-free, compressed metal microstructure is present. A stress crack cannot therefore propagate starting from a small surface depression with the aid of the notch effect, since there are no surface structures in the microstructure that can act as a starting point for a stress crack. Furthermore, a notch acts only on a fracture line in the material directly on the surface of the edge, while two sides of the propagating crack run on the surface. In contrast, a defect under the surface of the material is held at its entire outer edge by the material. Therefore, cracks preferably propagate inwards from an outer surface of the material using the notch effect.

Figure 5:
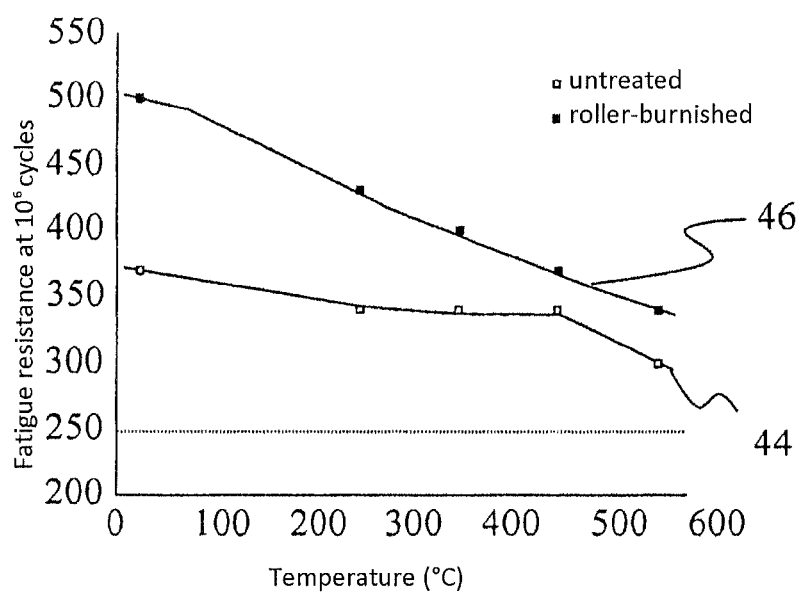
FIG. 5 shows a diagram that shows the improvement in fatigue resistance of a piston ring according to the invention compared with a conventional piston ring.

FIG. 5 shows a diagram that shows the improvement in fatigue resistance of a piston ring according to the invention compared with a conventional piston ring. In the diagram, temperatures between 0° C. and 600° C. are plotted along the x-axis. The y-axis shows the fatigue resistance using the unit of 200 MPa to 550 MPa at $10^6$ cycles. The lower curve 44 connects the measurement points of a conventional piston ring. The fatigue resistance decreases with increasing temperature. The upper curve 46 connects the measurement points of a piston ring according to the invention, in which the lower edge between the running face and the lower piston ring flank has been provided with compressive stresses by roller burnishing. It can be seen clearly that the piston ring according to the invention has a much increased fatigue resistance compared with a conventional piston ring. The fatigue resistance decreases more with increasing temperature, since the higher temperatures have the same effect as stress-free annealing in metal materials. The effects achieved by the compressive stress occur more in colder piston rings, since a cold piston ring has a higher strength overall.

An increase in the fatigue resistance of approx. 30% was achieved using roller burnishing, with a local plastic deformation of the metal from which the piston ring is manufactured. The present invention thus allows an increase in the fatigue and fracture resistance of a piston ring without resorting to expensive materials or to designs or layouts that are expensive to produce.

The present invention has been illustrated with reference to the figures using embodiments that should not be used to define or limit the scope of protection. The claims define the scope of protection of the invention. In addition to the disclosure of individual combinations of features in the figures, other embodiments that can be produced by a simple combination of the features of the embodiments shown should also be regarded as disclosed.

The invention claimed is:

1. A piston ring (2) having increased fatigue resistance, comprising a ductile, plastically deformable material, the piston ring (2) having a running face (4), which is delimited at a top by an upper running face edge (3) and at a bottom by a lower running face edge (1), the upper running face edge (3) and/or into the lower running face edge (1) at least along a part of a circumference of the piston ring have roller burnished surfaces, and wherein compressive stresses from roller burnishing are present in the roller burnished surfaces, and wherein each running face edge (1, 3) into which the compressive stresses are introduced is also provided with a bevel or a radius of curvature between 20 and 100 μm caused by the roller burnishing.

2. The piston ring (2) according to claim 1, wherein compressive stresses are only introduced into the lower running face edge (1).

3. The piston ring (2) according to claim 1, wherein compressive stresses are only introduced into the upper running face edge (3).

4. The piston ring (2) according to claim 1, wherein the radius of curvature is between 30 μm and 80 μm, and preferably between 40 μm and 60 μm.

5. The piston ring (2) according to claim 1, wherein the running face (4) is further provided with at least one wear protection coating or a running-in coating.

6. The piston ring (2) according to claim 1, wherein the piston ring comprises an iron or steel material or consists substantially or entirely of an iron or steel material.

7. The piston ring (2) according to claim 1, wherein the piston ring is formed as at least one of a compression ring, rectangular ring, tapered compression ring, piston ring with inner bevel, piston ring with inner angle, tapered compression ring with inner bevel, tapered compression ring with inner angle, double-sided trapezium ring, single-sided trapezium ring or L-shaped compression ring.

8. The piston ring (2) according to claim 1, wherein the piston ring is formed as a scraper ring or tapered scraper ring, wherein compressive stresses are introduced into an outer edge (1) of a lower piston ring flank (8) of the piston ring (2) by roller burnishing.

9. The piston ring (2) according to claim 1, wherein the compressive stresses are introduced only into a part of the piston ring that has an angular distance from a piston ring gap of at least 45°, preferably at least 90°, further preferably at least 135°.

10. The piston ring (2) according to claim 1, wherein the compressive stresses are introduced along the entire upper and/or lower running face edge (3, 1) of the piston ring (2).

11. A piston ring including an outer-most running face having at least a portion of which provided with a burnished surface finish imparting residual compressive stresses to said at least said portion.

\* \* \* \* \*